United States Patent [19]

Rütschle et al.

[11] Patent Number: 5,453,068
[45] Date of Patent: Sep. 26, 1995

[54] MACHINE TOOL

[75] Inventors: Eugen Rütschle, Mühlheim; Rudolf Haninger, Seitingen, both of Germany

[73] Assignee: Chiron-Werke GmbH & Co. KG, Germany

[21] Appl. No.: 303,779

[22] Filed: Sep. 9, 1994

[30] Foreign Application Priority Data

Sep. 11, 1993 [DE] Germany .......................... 43 30 851.1
Sep. 11, 1993 [DE] Germany .......................... 43 30 853.8
Sep. 11, 1993 [DE] Germany .......................... 43 30 854.6

[51] Int. Cl.⁶ .................................................. B23Q 3/157
[52] U.S. Cl. ...................................... 483/38; 483/48
[58] Field of Search ................................ 483/36, 37, 38, 483/39, 40, 41, 42, 43, 48, 51

[56] References Cited

U.S. PATENT DOCUMENTS

| | | | |
|---|---|---|---|
| 3,990,140 | 11/1976 | Polacek et al. | 483/38 X |
| 4,575,918 | 3/1986 | Matison | 483/43 X |
| 4,642,875 | 2/1987 | Rutschle | 483/40 |
| 4,683,638 | 8/1987 | Winkler et al. | 483/49 |
| 4,837,919 | 6/1989 | Hoppe | 483/38 |
| 4,850,764 | 7/1989 | Rutschle et al. | 409/198 |
| 4,932,118 | 6/1990 | Winkler et al. | 483/48 |

FOREIGN PATENT DOCUMENTS

| | | | |
|---|---|---|---|
| 0011710 | 10/1979 | European Pat. Off. | |
| 155240 | 5/1982 | Germany | 483/38 |
| 8432355 | 9/1986 | Germany | |
| 3620086A1 | 12/1987 | Germany | |
| 3521009 | 7/1988 | Germany | |
| 264397A1 | 1/1989 | Germany | |
| 9015333 | 5/1991 | Germany | |
| 3831869 | 1/1992 | Germany | |
| 30639 | 2/1984 | Japan | 483/43 |

Primary Examiner—William Briggs
Attorney, Agent, or Firm—Pretty, Schroeder, Brueggemann & Clark

[57] ABSTRACT

A machine tool comprises a tool exchanger for exchanging tools between a vertical-axis spindle and a load/unload position of a tool magazine. The load/unload position is located, in a front view of the machine tool, above the spindle and laterally offset therefrom. The tool exchanger, further, comprises two exchanger arms operating reciprocally, each contributing to conveying a first tool from the spindle to the load/unload position and, simultaneously, a second tool from the load/unload position to the spindle. The exchanger arms are each rotatable about one separate axis only. Each of the exchanger arms exchanges its associated tool between the spindle and one separate transfer position each. The two transfer positions associated to the two exchanger arms are located at different distances in front of the load/unload position on the tool magazine. Further, a transfer device is provided for transferring the tools between the load/unload position and, alternately, one of the transfer positions.

32 Claims, 11 Drawing Sheets

MACHINE TOOL

FIELD OF THE INVENTION

The invention relates to machine tools and, more particularly, to machining centers, i.e. numerically controlled machine tools for automatically performing milling and drilling operations on workpieces.

Still more specifically, the invention relates to a machine tool having a tool exchanger for exchanging tools between a vertical-axis spindle of a spindle stock and a load/unload position of a tool magazine. The load/unload position is located, in a front view of the machine tool, above the spindle and laterally offset from it. The tool exchanger, further, comprises two exchanger arms that operate reciprocally for exchanging a first tool from the spindle to the load/unload position, and a second tool from the load/unload position to the spindle, respectively.

BACKGROUND OF THE INVENTION

A machine tool of the afore-mentioned kind has been known from U.S. Pat. No. 4,932,118.

In the known machine tool, a double-spindle arrangement is to be implemented by the fact that two vertical-axis spindles are arranged next to one another in a common spindle head. The tool changer for each individual spindle of this known machine tool comprises two changer arms that, in a reciprocating manner, convey tools between a lower spindle position and an upper transfer position on a tool magazine. The transfer position is located at a lateral distance from the spindle axis, for each spindle, on the side facing away from the respective other spindle.

A relatively complicated movement sequence for the two changer arms is therefore necessary with this known arrangement, and must be asymmetrical because the changer arms are arranged symmetrically with respect to the spindle axis but both operate between a transfer position arranged outside the spindle axis and the spindle position in the spindle axis. Moreover, since both changer arms operate between the same positions, steps must be taken to ensure that as the changer arms operate in a reciprocating manner, no collision occurs between the arms and the tools that are held by grippers at the free ends of the changer arms.

For this reason, with the known machine tool it is necessary to pivot the changer arms about a plurality of axes in order to ensure the necessary movement sequence.

Although the arrangement described above can be used successfully on double-spindle machine tools, there are also applications in which this mechanical complexity is not necessary in the context of a single-spindle machine.

In another prior art machine tool, as disclosed in U.S. Pat. No. 4,683,683, the tool magazine is arranged in a U-shape in a horizontal plane (called a "horseshoe magazine"). It thus surrounds the spindle head and traveling column on both sides and at the rear. The magazine is provided, on each of the two free ends of the forward-facing arms of the U, with a transfer position for tool holders. A tool changer with two changer arms is arranged on the spindle head. One changer arm is articulated on each side of the spindle head, so that tools can be brought from one spindle of the spindle head, located below the transfer position, to one or the other transfer position. Tool changing is thus accomplished in a reciprocating manner. This means that one of the gripper arms is in each case taking out of the spindle the tool for the machining operation that has just been completed and conveying it into the one transfer position allocated to it, while the other changer arm is conveying the tool needed for the next machining operation out of the other transfer position of the tool magazine allocated to it, and into the spindle.

With this known machine tool the tools circulate in the tool magazine in a horizontal plane. A continuous path for the tools thus runs on the inner edge of the U and parallel thereto on the outer edge, and is reversed, in each case through 180 degrees, at the free ends of the arms of the U on a semicircular path.

A conveyor chain, provided with storage locations for the tools or tool holders, runs along the continuous path. The storage locations are configured as U-shaped grippers that extend outward transversely to the conveyor chain, and form a receptacle by the fact that the two arms or fingers of the U-shaped gripper engage into the standardized V-groove of the tool holder.

The arrangement is such that the tools or tool holders are held with their axis outside the lengthwise center plane of the conveyor chain. This creates two practical problems, however:

The first problem consists in the fact that the tools, held with their center of gravity outside the lengthwise center plane, are exposed to strong centrifugal forces in the outside curves of the continuous path. Particular steps must therefore be taken to retain the tools in the grippers of the conveyor chain which form the storage locations.

A second problem consists in the fact that the free ends of the gripper fingers approach one another in the inside curves of the continuous path. A certain spacing between the grippers along the conveyor chain must therefore be maintained so that the gripper fingers do not touch when passing through inside curves.

On the other hand, however, this spacing leads to a reduction in the number of tools for a given length of conveyor chain.

Machine tools of the aforesaid kind are used in large numbers in practice. Since machine tools of this kind are often acquired in order to manufacture only one specific workpiece in correspondingly large volumes over long periods of time, for example a certain component of a motor vehicle, such machine tools are often adapted to the respective specific application. It may happen in this connection that in individual cases, consideration must be given to certain additional requirements, for example additional fixtures in the operating region of the machine, or certain spatial circumstances at the machine's installation site.

It may happen in such cases that the aforesaid machine tool, because of its very compact configuration with many assemblies and accessories concentrated around the spindle head and the traveling column, does not represent the optimum solution, since a compact and compressed design of this kind naturally cannot be as easily adapted to certain circumstances.

OBJECT OF THE INVENTION

It is, therefore, an object underlying the invention to develop a machine tool of the kind mentioned at the outset such that a tool change may be achieved with reduced mechanical complexity, especially with regard to the kinematics of the exchanger arms.

It is still another object underlying the invention to improve a machine tool of the kind mentioned at the outset such that the tools, when being conveyed through the tool magazines, are not exerted to extreme dynamic forces and, further, a large number of tools may be arranged along an endless conveyor within the tool magazine.

It is still another object underlying the invention to improve a machine tool as mentioned at the outset such that there is plenty room available in the area of the spindle stock to arrange therein further accessories, modifications or the like of the machine tool.

SUMMARY OF THE INVENTION

These and other objects are solved by a machine tool, comprising:

a base member;

spindle stock means having a rotatable spindle therein, the spindle having a vertical spindle axis;

means for displacing the spindle relative to the base;

a tool magazine for storing a plurality of tools, the tool magazine having a load/unload position and a plurality of storage positions and having means for conveying the tools within the tool magazine between the load/unload position and the storage positions, the load/unload position being located above the spindle and laterally offset therefrom in a front view of the machine tool;

tool exchange means having a first and a second exchange arm, the arms operating reciprocally with respect to each other, for transferring a first tool from the load/unload position to the spindle and, simultaneously, tranferring a second tool from the spindle to the load/unload position;

the first exchange arm being rotatable about one first exchange arm axis only and exchanging the tools between the spindle and a first transfer position, the second exchange arm being rotatable about one second exchange arm axis only and exchanging the tools between the spindle and a second transfer position, the first and the second transfer positions being located at different distances from the load/unload position; and tool transfer means for transferring the tools between the first and the second tranfer position, respectively, and the load/unload position.

The object underlying the invention is completely achieved in this manner.

The fact that the changer arms are each rotatable about only one axis results in a very considerable simplification of the mechanical configuration, since the number of moving elements and the movement direction of the elements are drastically reduced compared with the arrangement mentioned earlier. In addition, with such simple movement sequences it is also easier to design them so that only steady-state movements occur, with no sudden changes in the movement sequence. This is important both for the stress and therefore wear on the tool changer, and for noise generation and tool changing speed.

It is true that the price for simplification of the tool changer in the region of the changer arms is that an additional transfer device is necessary, to convey the tools between the two transfer positions and the loading/unloading position. However, the additional transfer device can be implemented with very simple means, so that the additional outlay required at this point is much less than the complexity eliminated in the configuration of the changer arms.

In a preferred embodiment of the invention, the transfer positions and the spindle are arranged in a horizontal plane at the corners of an isosceles triangle, the apex of which is formed by the spindle.

The advantage of this feature is that the movement sequence of the tool changer or changer arms is further simplified because of the identical distance between the spindle on the one hand and the transfer positions on the other hand.

This is especially true when the apex angle of the triangle is approximately 48 degrees.

For design-related reasons, these dimensions have proven to be particularly advantageous.

It is further preferred if grippers of the changer arms are moved, during tool changing, only in vertical planes that contain the same side of the triangle.

The advantage of this feature is that, particularly when changer arms configured as parallelogram linkages are used, the tools are moved in an unchanging orientation between spindle and transfer position.

When angular dimensions as mentioned above are used, it is particularly advantageous if the rotation axes of the changer arms enclose between them an angle of approximately 48 degrees.

In a particularly preferred group of exemplary embodiments, the changer arms are driven by means of pinions that mesh with tooth sets, offset from one another, of a rack, the rack being displaceable in the vertical direction and the tooth sets being arranged in offset fashion over the periphery of the rack.

The advantage of this feature is that an extremely simple drive mechanism is used to produce the reciprocating movement of the changer arms, so that the goal of making the configuration of tool changer particularly simple is achieved particularly well in this manner.

With this variant of the invention it is also preferred if the rack can be displaced by means of a sinusoidal drive train.

The advantage of this feature is that in its vertical movement, the rack always performs a continuous reversal of direction at the top and bottom dead center points, eliminating shock or impact stresses on the tool changers.

In a further group of exemplary embodiments, the transfer device comprises a transfer gripper.

The advantage of this feature is that the tools can be conveyed between the transfer position and the loading/unloading position with features known in the art.

For this purpose it is particularly preferred if the transfer gripper can be displaced in the vertical and horizontal direction.

The advantage of this feature is that the said positions can be arranged at different heights, so that the transfer device and the changer arms can in turn be configured more simply so as to prevent collisions between these moving elements.

It is particularly preferred in this context if the tools are held in sheaths during transfer into the transfer device.

The advantage of this feature is to create two different grasping points, i.e. one on the standardized tool or tool holder, and another on the sheath. The transfer from the magazine to the transfer gripper on the one hand, and from the transfer gripper to the grippers of the changer arms on the other hand, can therefore be accomplished in a particularly simple manner.

A further group of exemplary embodiments, with features that can be utilized independently of the features discussed previously, is characterized by the fact that the tool magazine comprises a chain, guided along a continuous path, that is provided with storage locations for the tools and that displaces the tools received in the storage locations along the continuous path in such a way that a predefined storage location can be displaced into the loading/unloading position of the tool magazine, such that the storage locations are arranged in the lengthwise center plane of the chain.

The fact that the storage locations are arranged in the lengthwise center plane of the chain means that the centers of gravity of the tools or tool holders also extend in the lengthwise center plane. For this reason the centrifugal forces in large curves are much lower, since the radius of curvature of the movement path is smaller.

It is also of particular advantage that the spacings between the tool holders along the conveyor chain remain constant regardless of whether the conveyor chain is on a straight path segment or in an inside curve or outside curve. It is thus possible to provide a larger number of tools per unit length of conveyor chain.

A variant of this exemplary embodiment of the invention is characterized by the fact that the tools are held in separate sheaths in the chain in such a way that they are displaced with their axes in a lengthwise center plane of the chain.

The advantage of this feature is firstly that the conveyor chains can be designed independently of the type of tool holder, since the necessary adaptation to the different tapers and the like of the tool holders can take place in the sheaths. A further advantage of this feature is that separate handling of sheath and tool or tool holder is possible, which is advantageous, during tool loading and unloading, especially when a separate transfer device is provided between the tool magazine and the changer arms of the tool changer.

In a preferred embodiment of the exemplary embodiments just mentioned, the chain comprises chain links that are joined to one another by means of chain pivots, the chain links having a sleeve to receive the tools.

The advantage of this feature is that a particularly compact structure results, in which the receptacles for the tools are configured directly as chain links.

In this instance it is particularly preferred if the chain runs in a horizontal plane, and the sleeves are substantially cylindrical and open toward the bottom.

The advantage of this feature is that access to the storage locations in the chain is particularly easy.

In a development of this exemplary embodiment, the sleeves are closed off at their top by means of a cover that is provided with a first locking device for the tools.

The advantage of this feature is that the tools or tool holders are held in the storage locations of the chain, and can be released in the loading/unloading position, in a particularly simple manner.

This is especially true if the cover is pivotable in the horizontal plane and has a locking opening through which can be inserted a locking element, associated with the tool, which with the cover in a first pivot position is locked in the vertical direction, and in a second pivot position is released in the vertical direction.

It is evident that an extremely simple locking arrangement, in which only one pivot movement of a cover must be performed, is achieved in this manner. This movement can, however, occur in a very simple manner, for example by the fact that the cover is held in the first pivot position by the force of a return spring, and only upon unlocking by means of an actuation unit, for example by means of a pneumatic cylinder, is deflected against the force of the return spring into the second pivot position.

In this instance it is also particularly preferred if the cover is pivotable about an axis that is also the axis of the chain pivot.

A very simple configuration is achieved in this manner.

In a further group of exemplary embodiments of the invention, the features of which can also be utilized independently of the features discussed previously, the tool magazine is configured in an L-shape in a horizontal plane, a first arm of the L being arranged at the side of the traveling column, and a second arm of the L being arranged behind the traveling column.

A machine tool according to this exemplary embodiment of the invention offers, in contrast to the machine tool according to German patent 35 21 009, enough installation room on one side of the traveling column for the aforementioned special requirements. These special requirements may consist, for example, in the fact that additional accessories with a large physical volume, which must be arranged in the working space of the machine tool and displaced by and together with the traveling column during operation of the machine tool, must be made available.

All of this is possible in the machine tool according to the invention, since because of the basic design of the machine, one complete side of the traveling column is available for such additions and fixtures.

In a preferred development of this exemplary embodiment, the second arm is longer than the first arm.

The advantage of this feature is that tool magazines with a high tool capacity can also be constructed with the machine tool according to the invention; the capacity can be entirely equivalent to the capacity of "horseshoe" magazines. The reason for this is that the second arm, arranged behind the traveling column, can in principle be designed with any length, since no particular fixtures are now present in the space behind the traveling column, except perhaps for control cabinets or the like, which can however be moved a corresponding distance away without great difficulty.

In a further preferred embodiment of the invention, a first energy delivery chain, flexible only in one plane, is guided from a first, stationary articulation point in a horizontal plane to a second, movable articulation point on the traveling column.

With this feature, known in the art, the traveling column can be provided, very easily and effectively, with electrical power, compressed air, pressurized oil, water, and the like, all of the lines necessary for the purpose being combined into the first energy delivery chain. Because the first energy delivery chain is flexible only in one plane, specifically in the aforesaid horizontal plane, it can be swiveled or folded as desired in that horizontal plane, so that during its displacements in the horizontal plane the traveling column can move far away from the stationary articulation point and approach it again along any path.

With this exemplary embodiment, it is particularly preferred if the first energy delivery chain is arranged in a horizontal plane at the top end of the traveling column.

This feature, which is made possible by the freely mounted nature of the first energy delivery chain, has the advantage that further fixtures or moving parts can be provided in the space below the first energy delivery chain without interfering with the first energy delivery chain. Specifically, since the first energy delivery chain is articulated at one stationary point and at one point at the same height on the traveling column, it always remains in that horizontal plane during operation of the machine tool, and thus cannot collide with components or accessories arranged below it.

In this instance it is particularly preferred if the first energy delivery chain is arranged in a loop in the horizontal plane so that the loop is always located outside an interference contour of the second arm of the machine tool.

The advantage of this feature is firstly that the first energy delivery chain is always pivoted only in a large loop, and the stress on it is therefore low. On the other hand, however, there is the advantage that large vertical displacements of the spindle head are possible, during which the tool magazine can easily pass through the horizontal plane defined by the first energy delivery chain.

In a further preferred embodiment of the invention, a second energy delivery chain is guided in a vertical plane from a third articulation point on the traveling column to a fourth articulation point on the spindle head.

This feature again has the advantage that the spindle head can be provided, in a simple and reliable manner, with the necessary energy, signals, and the like.

In this instance it is particularly preferred if the second energy delivery chain is arranged on the side of the traveling column facing away from the first arm of the tool magazine.

This feature utilizes the advantage, already explained in detail, that no part of the tool magazine is present on this side of the traveling column, so that the space there can be used for the second energy delivery chain.

This is particularly advantageous if the second energy delivery chain is arranged in a loop in the vertical plane so that the loop hangs downward.

Specifically, this feature has the considerable advantage that a reduction in the total height of the machine tool is possible, since with conventional machine tools the energy delivery chain for supplying the spindle head was always arranged in a curve above the upper end of the spindle head, thus determining the total height of the machine tool. In many applications, however, the machine tools are intended to be placed in installation sites with limited vertical headroom, so that problems were occasionally encountered here with conventional machine tools.

According to the invention, it is also preferred if the third articulation point lies below the second articulation point.

This feature again has the previously mentioned advantage that the energy delivery chain required to supply the spindle head is located as far down as possible, even below the first energy delivery chain for the traveling column. Particularly safe movement sequences, with no danger at all of collisions, are possible in this manner.

It is understood that the features mentioned above and those yet to be explained below can be used not only in the respective combinations indicated, but also in other combinations or in isolation, without leaving the context of the present invention.

BRIEF DESCRIPTION OF THE DRAWINGS

An exemplary embodiment of the invention is depicted in the drawings and will be explained in more detail in the description below. In the drawings.

DETAILED DESCRIPTION OF THE PREFERRED EMBODIMENTS

Figure 1:
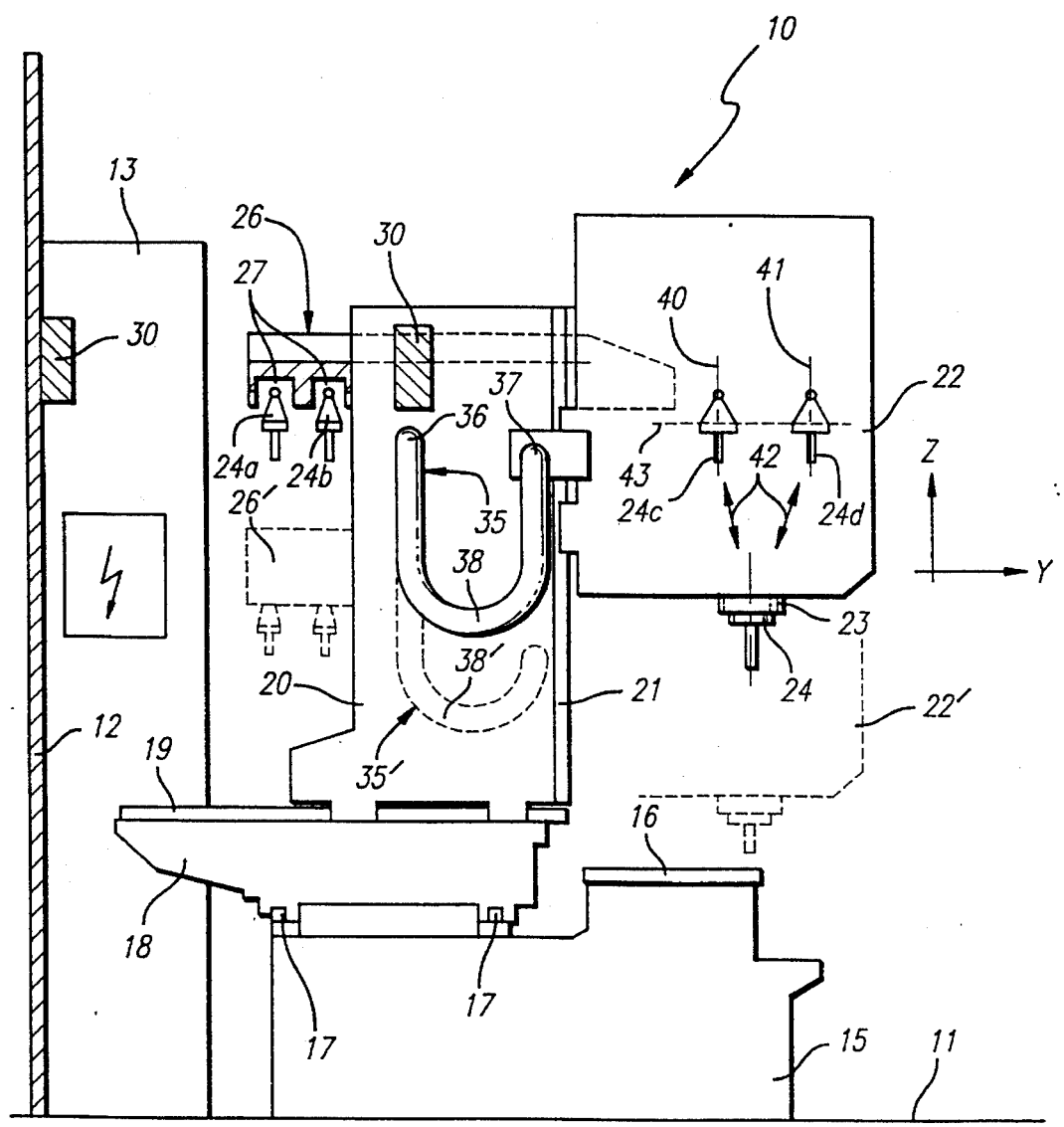
FIG. 1 shows an overall side view of an exemplary embodiment of a machine tool, partly cut away, along line I—I of FIG. 2.
Figure 2:
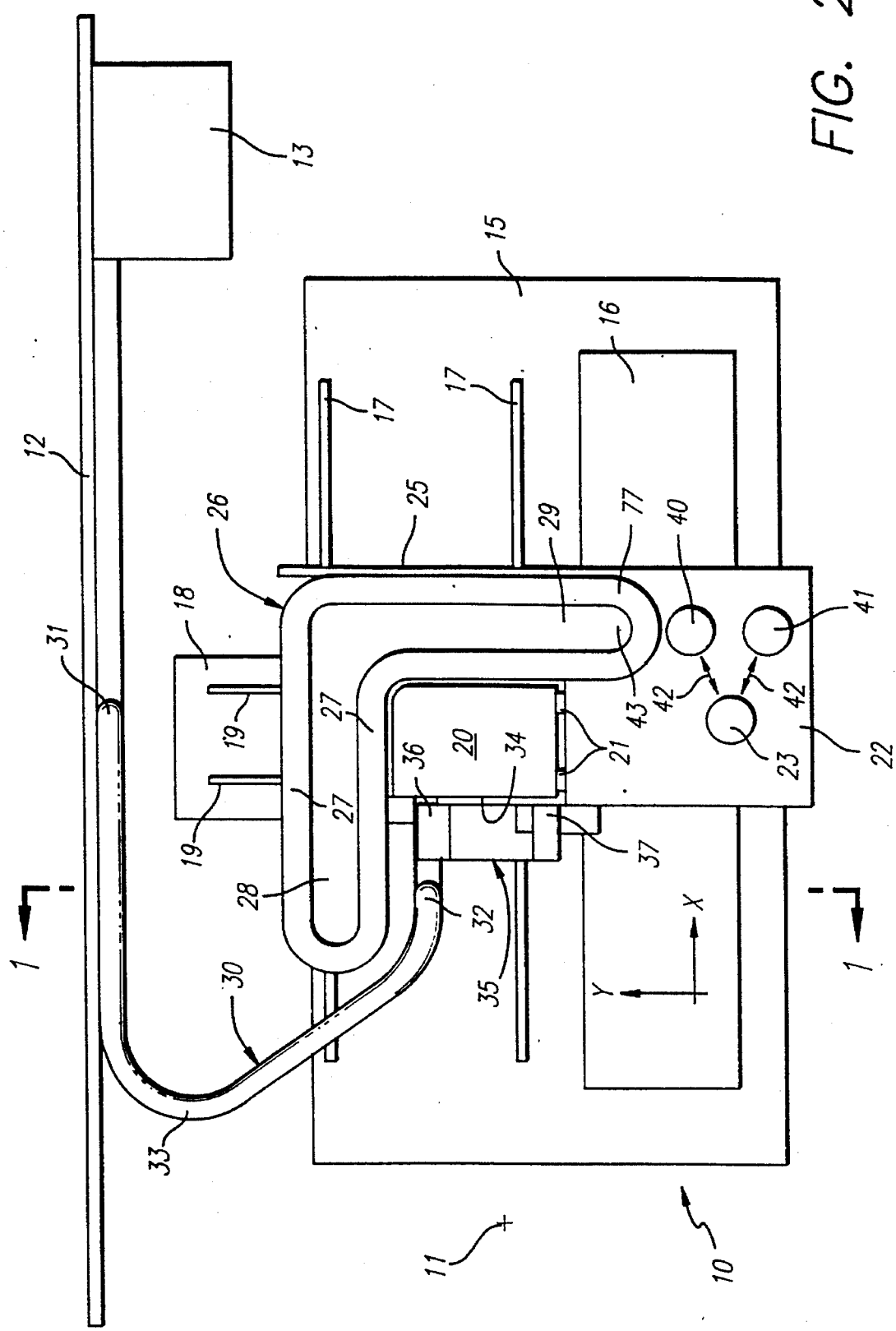
FIG. 2 shows a top view of the machine tool according to FIG. 1.
Figure 10:
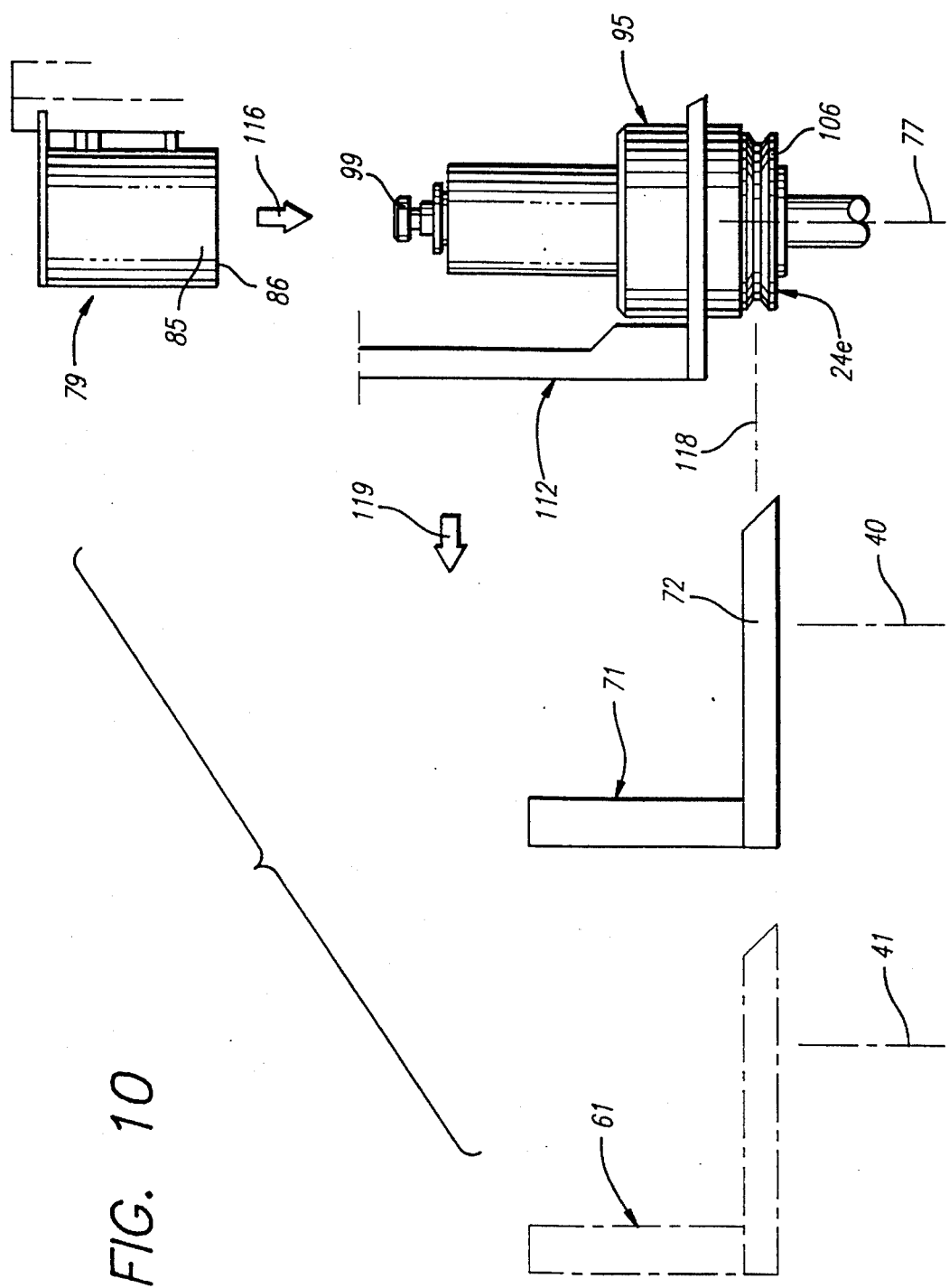
FIG. 10 shows the arrangement according to FIG. 9, but in a second operating position.

In FIGS. 1 and 2, 10 designates the totality of a machine tool, specifically a numerically controlled machining center used for automatic machining of workpieces. Machining centers of the type in question are used substantially to perform drilling and milling operations.

The machine tool 10 stands on a foundation 11 of a machine hall or the like. The machine tool 10 is separated from its environment on its rear side by a partition 12. Further partitions can also be provided in order to encapsulate the machine tool from the side, the front, or even the top as well. Partitions of this kind are known, and for the sake of clarity are not depicted in the drawings.

Located on the partition 12 is a standard control cabinet 13 by means of which the machine tool can be supplied with signals and energy, i.e. substantially power, hydraulic fluid, compressed air, water, and the like.

The machine tool 10 rests on a machine bed 15, which has on the front side of the machine 10 an elongated workpiece table 16. In the exemplary embodiment depicted, the machine tool 10 is a long-bed machine with a fixed workpiece table 16. It is understood, however, that the workpiece table 16 can also be inherently movable in design.

At the rear of the workpiece table 16, the machine bed 15 is provided with rails 17 that run parallel to the workpiece table 16. The rails 17 constitute the "X-axis" of the machine tool 10.

A carriage 18, which is driven for example by means of a spindle, a toothed belt, or the like, runs on the X-axis rails 17.

Rails 19, which are arranged at right angles to the X-axis rails 17, also extend on the top of the X-axis carriage 18. The rails 19 thus define the "Y-axis" of the machine tool 10. A further carriage 20, which is usually referred to as a "traveling column," runs on the Y-axis rails 19. The machine tool 10 is therefore also referred to as a "traveling column machine."

Vertically extending rails 21, which run at right angles to the rails 17 and 19 and define the "Z-axis" of the machine tool 10, are located on the front of the traveling column 20.

A carriage 22, usually referred to as a "spindle head," runs on the Z-axis rails 21 of the traveling column 20.

The spindle head 22 is provided with a vertical-axis spindle 23. It is evident in FIG. 1 that a tool 24 is clamped into the spindle 23.

To the extent described so far, the machine tool 10 is a machining center of conventional design.

The peculiarity of the machine tool 10 according to FIGS. 1 and 2 consists in the fact that the spindle head 22 is provided with retaining arms 25, only one of which, for the sake of clarity, is depicted in the drawings, in FIG. 2 on the right-hand edge of the spindle head 22. These retaining arms 25 support a tool magazine 26 which is L-shaped in the top view of FIG. 2. The tool magazine 26 contains, in a manner known in the art, a continuous path 27, also L-shaped, for tools 24a, 24b. The arm 28 of the tool magazine 26 extending in the X-axis loops around the traveling column 20 but is not joined to it. The arm 29 of the tool magazine 26 running in the Y-axis extends, as clearly shown in FIG. 2, on the right side of the traveling column 20 in that Figure, but without touching it on that side. Overall, therefore, the tool magazine 26 is joined only to the spindle head 20, and is displaced along with it in the Z-axis. This results in a "variable tool changing plane," in a manner known in the art.

As has already been mentioned, it is necessary to transfer signals and energy from the schematically indicated control cabinet 13 to the moving elements of the machine tool 10, in particular to the traveling column 20 and the spindle head 22.

For this purpose, the machine tool 10 is provided with a first energy delivery chain 30 acting in the X-Y direction. This X-axis energy delivery chain 30 is, as FIG. 1 shows, arranged at the top end of the machine tool 10 and there first extends in an immovable manner from the control cabinet 13 to an immovable articulation point 31 that is located on the partition 12 at approximately half the length of the workpiece table 16 in the X-axis. From the stationary articulation point 31, the X-axis energy delivery chain 30, previously stationary, continues into a section that is flexible in a horizontal plane, and runs freely through space as a loop 33 and ends at a movable articulation point 32 on the open side 34 of the traveling column 20. For this purpose, the X-axis energy delivery chain 30 is configured, in a known manner, in such a way that although it can be curved over large areas in the horizontal plane, it is rigid in the vertical direction. The X-axis energy delivery chain 30 is therefore cantilevered freely between the articulation points 21 and 32 without hanging downward at the free end of the resulting loop 33.

The X-axis energy delivery chain 30 transmits all the necessary signals, energies, and media that must be conveyed to the displaceable traveling column 20 when the latter is displaced in the X-axis or Y-axis.

A second energy delivery chain 35 that acts in the Z-axis is provided in order to transfer energy in a similar manner from the traveling column 20 to the spindle head 22 that can be displaced thereon in the Z-axis.

The Z-axis energy delivery chain 35 leads from a first, rear articulation point 36 on the traveling column 20, which is located at a constant height, to a second, front articulation point 37 on the spindle head 22. The second articulation point 37 on the rear side of the spindle head 22 can therefore be displaced together with the spindle head 22 in the Z-axis, i.e. in the vertical direction.

This is indicated in FIG. 1 by the fact that the spindle head 22 is shown both with solid lines in a first vertical position, and, as 22', in dot-dash lines in a lowered position It is evident that the Z-axis energy delivery chain 35 then changes its position from 35 to 35'; the first articulation point 36 remains stationary (provided the traveling column 20 is otherwise immobile), while the second articulation point 37 moves downward in the vertical direction. The articulation of the X-axis energy delivery chain 30 in the movable articulation point 32 on the traveling column 20, and the overall arrangement of the Z-axis energy delivery chain 35 on the left side 34 (in FIG. 2) of the traveling column 20 with the articulation points 36 and 37 just described, are possible in design terms because the tool magazine 26, as explained above, is L-shaped. In contrast to a known U-shaped tool magazine ("horseshoe magazine"), in the machine tool 10 according to FIGS. 1 and 2 the left side 34 (in FIG. 2) of the traveling column 20 is thus free, and can therefore be used for the aforementioned fixtures of the energy delivery chains 30 and 35.

It has already been mentioned and explained that the Z-axis energy delivery chain, as is clearly evident from FIG. 1, hangs downward in a loop 38. This means that the space above the traveling column 20 is free of fixtures. This stands in contrast to other known machine tools in which the Z-axis energy delivery chain is looped vertically upward, so that it projects upward in a curve from the top of the machine tool. It is also evident from FIG. 2 that the tool magazine 26, which can move vertically together with the spindle head 22, is designed in terms of its interference contour, in the view according to FIG. 2, so that the free end of the X-axis leg 28 always lies inside the loop formed by the X-axis energy delivery chain 30 as the traveling column 20 is displaced in the X- or Y-axis. As a result the entire tool magazine 26 can project in the vertical direction through the horizontal plane defined by the X-axis energy delivery chain 30 with no risk of a collision with the X-axis energy delivery chain 30.

It is also clear from FIG. 2 that the front free end of the Y-axis arm 29 of the tool magazine 26 ends next to the spindle 23 on the right when viewed from the front.

In order nevertheless to allow rapid and effective tool changing in a reciprocating manner, with the machine tool 10 provision is made for a first transfer position 40 and a second transfer position 41 for tools 24c and 24d respectively, arranged at a distance from one another on an axis 43, to be provided in front of the free end of the Y-axis arm 29. The axis 43 is at the same time the axis of symmetry of the Y-axis arm 29.

In this manner the tool change, as indicated by arrows 42, must be accomplished between the first transfer position 40 and the spindle 23 on the one hand, and the second transfer position 41 and the spindle 23 on the other hand. In addition, during a tool change it is necessary to displace the tools 24 out of the tool magazine 26 along the axis 43 to the transfer positions 40 and 41 and fetch them from these transfer positions 40 and 41 back into the tool magazine. This is described in further detail later on.

Figure 3:
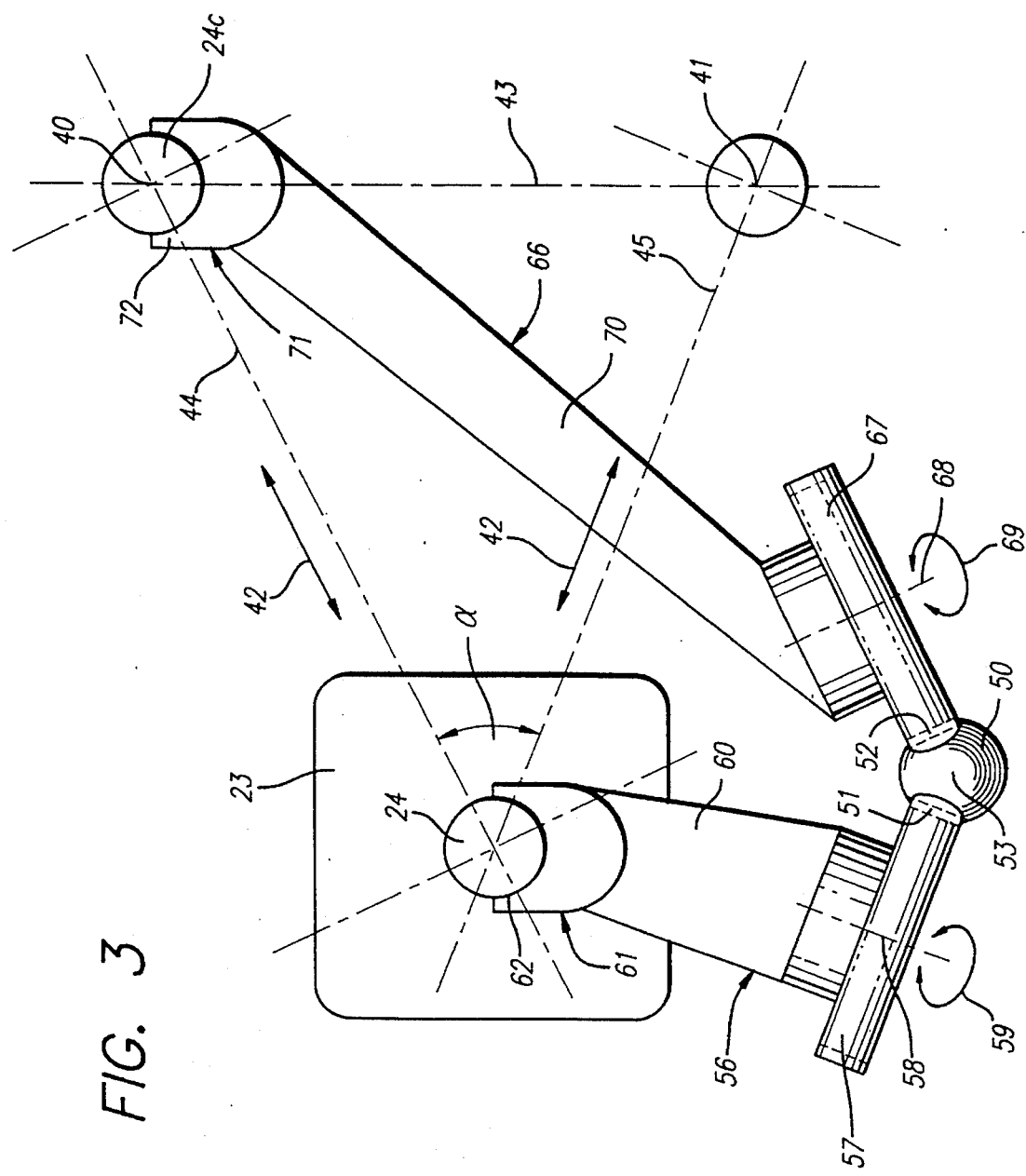
FIG. 3 shows, at greatly enlarged scale and also in top view, a view of a tool holder on a spindle of the machine tool according to FIGS. 1 and 2, in a first operating position.
Figure 4:
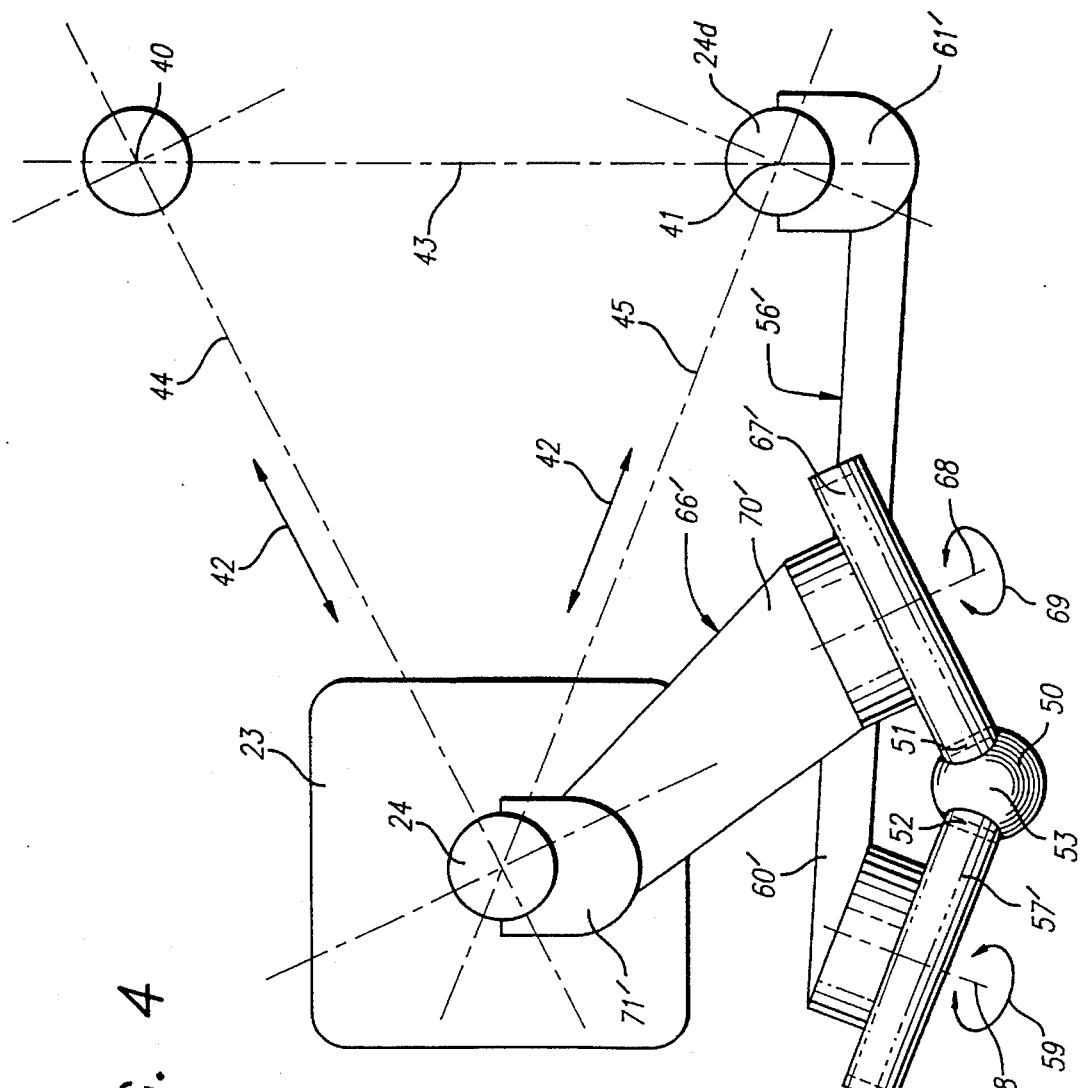
FIG. 4 shows the tool changer according to FIG. 3 but in a different operating position.

FIGS. 3 and 4 schematically depict the two working positions of a tool changer that is designed to accomplish the tool change between the spindle 23 and transfer positions 40 and 41 that was just outlined. The view in FIGS. 3 and 5 corresponds to that in FIG. 2, and FIGS. 3 and 4 depict conditions only at greatly enlarged scale.

As is clearly evident, the arrangement selected is such that the axis of the spindle 23 and the axes of the transfer positions 40 and 41 are located on an isosceles triangle, with the unequal side located on the axis 43. The two identical sides, which in FIGS. 3 and 4 are depicted as dot-dash connecting lines 44 and 45, enclose between them an angle α at the spindle 23 of preferably 48 degrees.

In order to achieve an extremely simple configuration for the tool changer, a vertical-axis rack 50 is provided at a distance in front of the spindle 23 and offset to the right, in the depiction of FIG. 3, with respect to it. The rack 50 is provided in the lengthwise direction with a first tooth set 51 and a second tooth set 52, which are arranged symmetrically at the periphery of the rack 50 and offset from one another.

The rack 50 is displaceable in the direction of its vertical axis 53, with a periodic raising and lowering movement. A "sinusoidal drive train," which ensures that the reversal of direction at the top and lower dead center points is accomplished with continuous movement, is preferably provided for this purpose.

The rack 50 drives a first changer arm 56 and a second changer arm 66 in opposite directions.

For drive purposes, the changer arms 56, 66 are each provided with a pinion 57 and 67. The pinions 57, 67 mesh with the tooth sets 51 and 52. The arrangement is selected so that in the depiction of FIGS. 3 and 4, the pinions 57, 67 each enclose an angle of preferably 24 degrees with the X-axis. This means that the axis 58 of the pinion 57 is perpendicular to the connecting line 45, while the axis 68 of the pinion 67 is perpendicular to the connecting line 44.

As a vertical displacement of the rack 50 occurs, the pinions 57, 67 are rotated in opposite directions about their axes 58 and 68, as indicated by the arrows 59 and 69.

Arms 60 and 70 of the changer arms 56 and 66 are thereby pivoted, arms 60, 70 being configured in a manner known in the art as parallelogram linkages (details of which are not depicted for the sake of clarity).

The arms 60, 70 are provided at their free ends with grippers 61, 71 that in turn end in fingers 62, 72.

In the depiction according to FIG. 3, the first changer arm 56 extends to the spindle 23, where the fingers 62 of the gripper 61 surround the tool 24 or tool holder.

The second changer arm 66, on the other hand, extends to the first transfer position 40, where the gripper 71 with fingers 72 surrounds the tool 24c or tool holder. The axes of the grippers 61, 71 are aligned parallel to one another and are both parallel to the connecting axis 43 between the transfer positions 40 and 41.

When the rack 50 is then displaced, perpendicular to the plane of the drawing of FIGS. 3 and 4, into its opposite end position, pinions 57 and 67 rotate in opposite directions with the result that the two changer arms 56 and 66 are pivoted in opposite directions.

The free end of the first changer arm 56, i.e. the gripper 61, is then pivoted along the connecting line 45, until it has reached the second transfer position 41 according to FIG. 4.

Correspondingly, the second changer arm 66 is pivoted in the opposite direction so that its gripper 71 is guided from its initial location at the first transfer position 40 to the spindle 23, as is evident in FIG. 4. The movement of the gripper 71 occurs along the connecting line 44.

In a practical exemplary embodiment, the transfer positions are located above the spindle 23, which opens downward, so that during a tool change the grippers 61 and 71 each describe approximately a quarter-circle in opposite directions, such that the movement path of the quarter-circle ends in the region of the transfer positions 40, 41 in the vertical direction, while it terminates in a horizontal movement in the region of the spindle 23.

As may be gathered from the above discussion, the movement sequence of the changer arms 56 and 66 is extremely simple, just as the actuation mechanism of the rack 50 can be configured and activated in a very simple manner. The price of this simplicity of design and movement sequence, however, is that unlike known designs for machining centers, the changer arms 56, 66 are not both pivoted back and forth between the same end positions, but rather than a separate transfer position is provided for each changer arm 56, 66, specifically the first transfer position 40 for the second changer arm 66 and the first transfer position 41 for the first changer arm 56. These transfer positions 40, 41 are at a distance from one another and thus necessitate separate transfer means. This will be discussed in greater detail later on.

FIG. 5 again depicts the L-shaped tool magazine 26 in a top view, with additional details. It is evident that reversing and conveying units 75 are provided both at the free ends of the arms 28, 29 and at the joining point of the arms 28, 29, to ensure transport of the tools or tool holders along the continuous path 27 as indicated by arrows 76.

Figure 5:
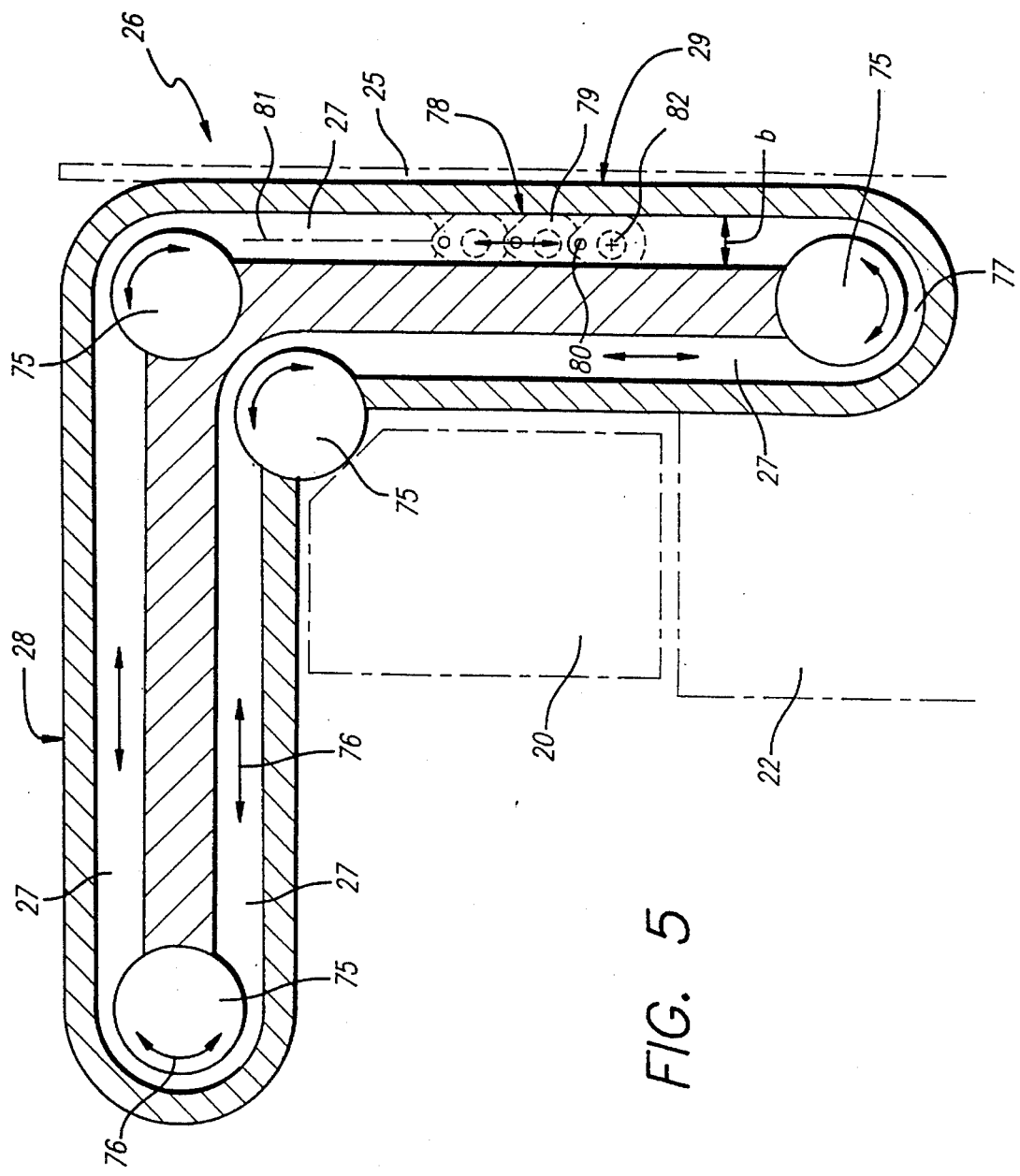
FIG. 5 shows, at a scale enlarged by comparison with FIG. 1 and 2, a top view of a tool magazine of the machine tool according to FIGS. 1 and 2.

Also shown in FIG. 5, at 77, is a loading and unloading position at the front free end of the Y-axis arm 29.

It is also evident from FIG. 5 that therein the X-axis arm 28 is longer than the Y-axis arm 29. This is possible and advantageous because more space is available in the X-axis on the rear side of the traveling column 20 than laterally in the Y-axis next to the traveling column 20. By correspondingly extending the X-axis arm 28, it is therefore possible to recover the space lost by the fact that the left (in FIG. 5) side of the traveling column 20 and spindle head 22 has been left unoccupied by a section of the tool magazine.

One peculiarity of the tool magazine 26 consists in the fact that the tools or tool holders, unlike in conventional magazines, are transported in a chain 78 and not on a chain. The chain 78 consists of chain links 79 that are joined to one another in articulated fashion by chain pivots 80.

With conventional chains in tool magazines, the tools are located in gripper-like receptacles that extend perpendicular to the lengthwise center plane of the chain. This means that in the region of curves, the particular tools lying on the outside are exposed to strong centrifugal forces. This requires special safety measures to prevent tools from flying out. On the other hand, there exists with these conventional tool magazines the problem that when passing through inside curves the grippers may collide with one another. With conventional chains of this kind, therefore, sufficient spacing must be provided between the gripper elements to prevent such collisions. On the other hand, however, this leads to a reduction in the number of tools that can be accommodated in such a chain.

The chain 78 in FIG. 5, in contrast, is configured so that the tools run with their axis 82 in storage locations 83 in the lengthwise center plane 81 of the chain 78. The tools can thus be guided with a close spacing between them, and the aforesaid problems with outside and inside curves do not occur.

Figure 6:
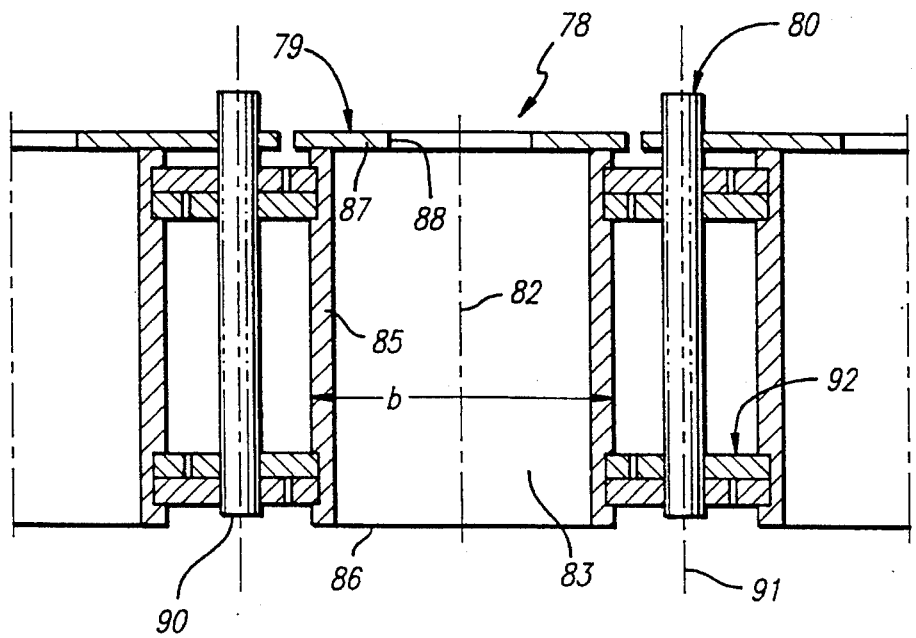
FIG. 6 shows, at a scale further enlarged by comparison with FIG. 5, a side view, sectioned along line VI—VI of FIG. 7, of a conveyor chain of the machine tool according to FIG. 5.
Figure 7:
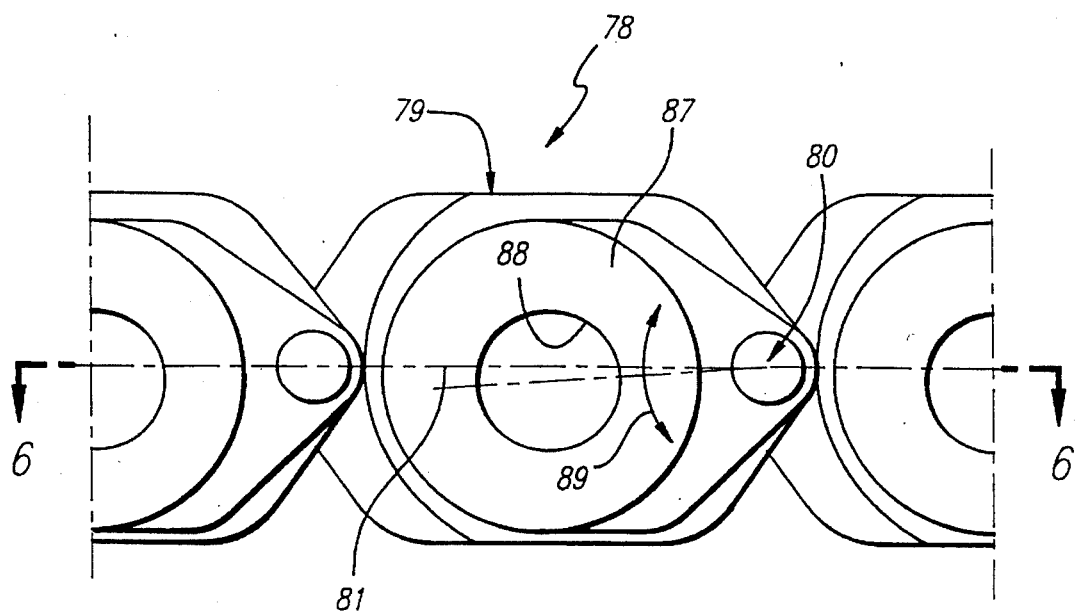
FIG. 7 shows a top view of the conveyor chain according to FIG. 6.

FIGS. 6 and 7 depict the details of the chain 78 of interest in the above context, to the extent necessary for comprehension.

It is evident that each chain link 79 consists substantially of a cylindrical sleeve 85 that is open at the bottom, as indicated at 86. Each sleeve 85 thus forms a storage location 83 for a tool 24, as indicated in FIG. 6 by the tool axis 82. At the top end, however, the sleeve 85 is closed off by a cover 87. The cover 87, however, is pivotable about the axis of the chain pivot 80, as indicated by an arrow 89 in FIG. 7.

Located in the cover 87 is a locking opening 88 that, with the cover 87 in the pivoted position depicted in FIG. 7, locks a tool holder in the sleeve 85 in the vertical direction, as will be described later on. On the other hand, when the cover 87 is pivoted back out of the pivoted position depicted in FIG. 7 into a position symmetrical with respect to the lengthwise center plane 81, the locking opening 88 releases the corresponding counterelement of the tool holder, which can thus be removed downward out of the sleeve 85.

The chain pivots 80 consist substantially of a pivot pin 90 that defines an axis 91 of the chain pivot 80. The pivot pins 90 are provided with a hinge-like pivot 92 to join adjacent sleeves 85 pivotably to one another. As already mentioned, the pivot pins 90 at the same time constitute the pivot axis for the covers 87.

The actuation elements for pivoting the cover 87 are not depicted in detail for the sake of clarity. For example, in the locked direction (FIG. 7) the cover 87 can be held in spring-loaded fashion, and it can then be brought, by means of a pneumatic piston-cylinder unit that grasps a suitable projection of the cover 87, briefly into the unlocked position.

Figure 8:
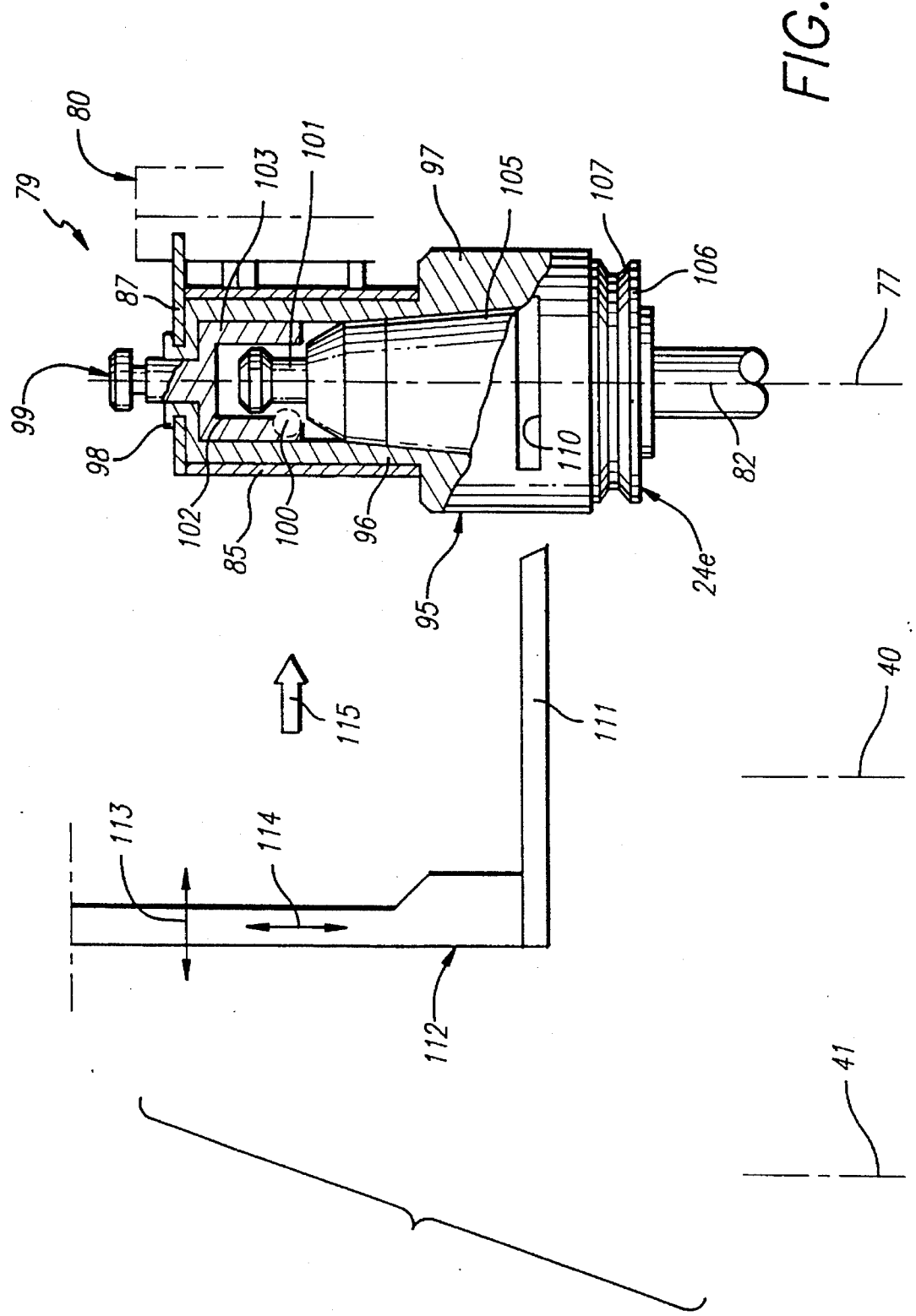
FIG. 8 shows a schematic depiction of a tool holder, with associated transfer gripper, located in a loading/unloading position of the tool magazine according to FIG. 5, to depict details of the tool holder held in the loading/unloading position.

FIG. 8 shows that the tools or tool holders 24e are not inserted directly into the sleeves 85 of the chain links 79.

Instead, provision is made, in the context of the present invention, for the tools 24e themselves to be inserted first into a sheath 95 that is then in turn introduced into the sleeves 85.

The sheaths 95 consist in the center region of a hollow cylindrical neck 96 of smaller diameter, and in the lower region of an approximately hollow cylindrical base 97. The upper end of the sheath 95 consists first of a locking collar 98 that substantially consists of a thickened annular shoulder and an annular groove lying behind it. The locking collar 98 is dimensioned so that with the cover 97 in the locked position, it is axially secured thereby in the cylindrical sleeve 85, while with the cover 87 in the unlocked position, the locking opening 88 is somewhat larger than the locking collar 98, so that the latter, together with the sheath 95, can be removed downward out of the cylindrical sleeve 85.

An actuation knob 99 for a ball catch 100 (only schematically indicated) of the sheath 95 extends in the locking collar 98. In a manner known in the art, the ball catch 100 has a ball that can be radially released or locked, and that engages in an annular groove of a standard head 101 of a tool holder and can thus axially lock or release it.

A locking sleeve 103 loaded by a spring 102 serves to actuate the ball catch 100. The locking sleeve 103 is actuated by the fact that the actuation knob 99 is pushed downward in the depiction of FIG. 8. The spring 102 is then compressed, and the balls of the ball catch 100 can fall into a lateral recess of the locking sleeve 103.

In this state the tool holder 24e can be removed downward out of the sheath 95, while otherwise it is axially fastened in it.

For this purpose, the contours of the lower section of the neck 96 and the base 97 are matched to a taper 105 of the tool 24e.

The arrangement selected is such that an annular flange 106 with the standard V-groove 107 of the tool 23e projects downward out of the base 97 of the sheath 95.

It is also clearly evident from FIG. 8 that the base 97 of the sheath 95 is provided laterally with a groove 110.

This groove 110 is matched to fingers 111 of a transfer gripper 112. It is thus possible to grasp the sheath 95 positively by means of the fingers 111 of the transfer gripper 112, and displace it in the horizontal direction and vertical direction together with the transfer gripper 112, as indicated in FIG. 8 by arrows 113 and 114.

FIG. 8 shows a starting position in which the tool 24e, together with the sheath 95, is to be removed from the chain link 79 of the chain 78 in the tool magazine 26, and then brought to the first transfer position 40. The movement sequence occurring in this context will be explained later on with reference to FIGS. 9 to 12.

To initiate the movement operation from the position according to FIG. 8, first the transfer gripper 112 is displaced in the horizontal direction to the sheath 95, as depicted by an arrow 115 in FIG. 8. This is done, for example by a pneumatic piston-cylinder unit (not shown) of conventional design.

Figure 9:
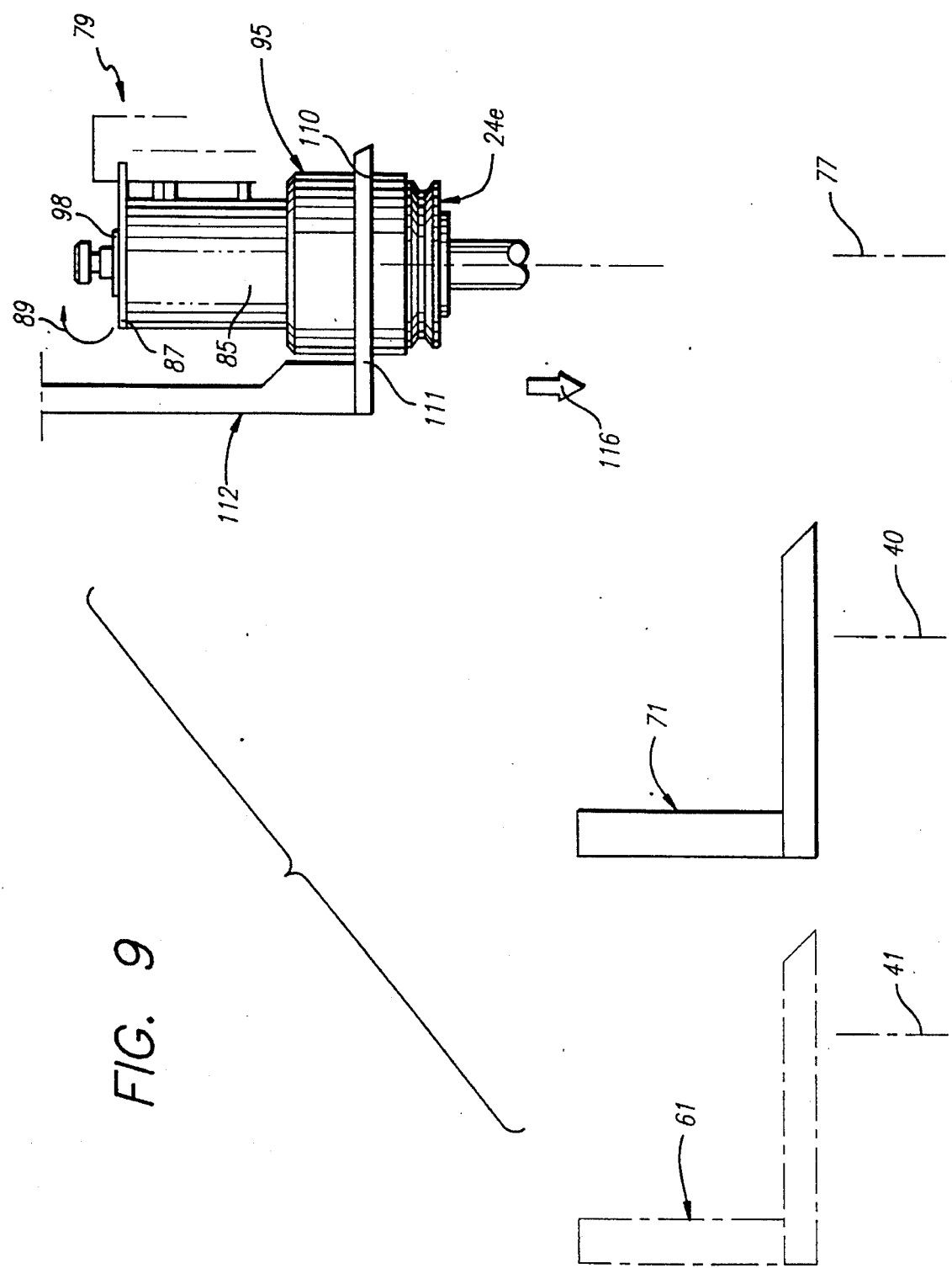
FIG. 9 shows, at a scale slightly reduced by comparison with FIG. 8, a schematic depiction of the tool holder located in the loading/unloading position in a first operating position.

When the transfer gripper 112 has reached its end position in this context, the fingers 111 reach into the groove 110 of the sheath 95, as is evident in FIG. 9 (at slightly reduced scale), and snap into place there.

FIG. 9 additionally shows the gripper 71 of the second changer arm 66, waiting in the first transfer position 40 for the tool 24e. To illustrate the entire operation, dot-dash lines are also used to show the second transfer position 41 and the gripper 61 of the first changer arm 56 there, although at the moment depicted in FIG. 9, said gripper 61 of the first changer arm 56 is located in the region of the spindle 23 (compare FIG. 3, which depicts the same moment).

When the transfer gripper 112 has reached the position depicted in FIG. 9, the cover 87 is brought, by means of an actuation unit (not depicted), in the direction of the arrow 89 out of the locked position of FIG. 7 into the unlocked position, so that the locking collar 98 is released.

The transfer gripper 112 can now be displaced downward, as indicated in FIG. 9 by an arrow 116. The sheath 95 with the tool holder 24e is then pulled downward out of the sleeve 85.

This is depicted in FIG. 10, where it is evident that the transfer gripper 112 has now reached a lower position in which the sheath 95 has left the sleeve 85 so that the actuation knob 99 is now located below the opening 86. The downward travel (arrow 116) of the sheath 95 is then continued until the annular flange 106 of the tool 24e is located at the same height as the fingers 72 of the gripper 71. This is indicated in FIG. 10 by a dot-dash line 118.

The transfer gripper 112 is then displaced in the horizontal direction by means of a suitable control system, specifically to the left in the depiction of FIG. 10.

Figure 11:
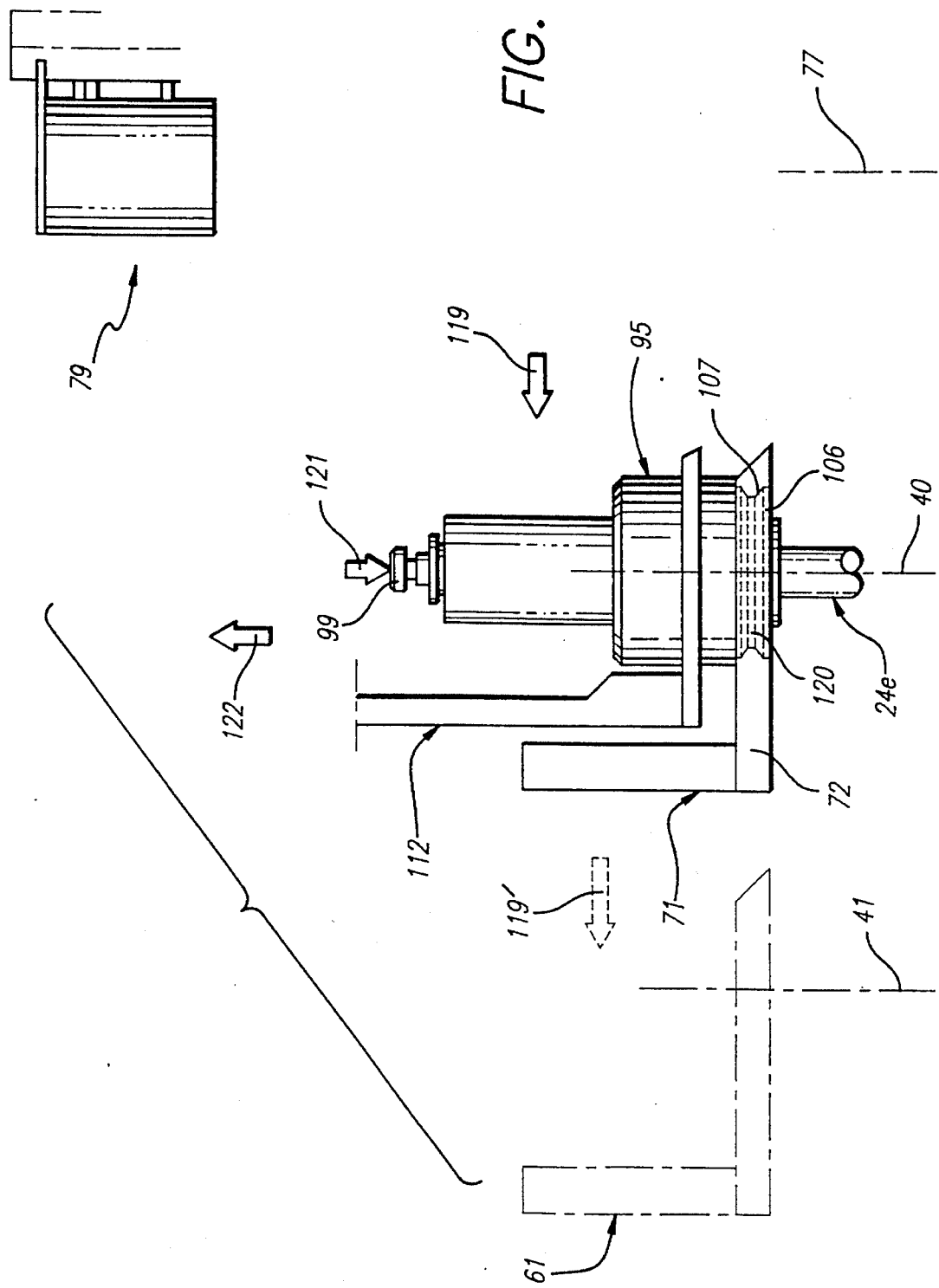
FIG. 11 shows the arrangement according to FIG. 9, but in a third operating position.

As FIG. 11 shows, this causes the annular flange 106 with the V-groove 107 to come into engagement with lands 120 that are arranged on the inside of the fingers 72 of the gripper 71.

At this moment, therefore, the tool 24e is also held in a vertical direction by the fingers 72 of the gripper 71.

As soon as this state is achieved, the actuation knob 99 can be pushed downward by another actuation unit (also not depicted), as indicated in FIG. 11 by an arrow 121. As was explained with reference to FIG. 8, depression of the actuation knob 99 causes the positive connection at the ball catch 100 between the sheath 95 and tool 24e to be released. It is therefore possible, after the actuation knob 99 has been depressed, to displace the transfer gripper 112 upward without also taking the tool 24e, which at this moment is held by the fingers 72 of the gripper 71. This movement of the transfer gripper 112 is indicated in FIG. 11 by an arrow 122.

Lastly, FIG. 11 also shows with an arrow 119' that the same starting position of FIG. 11 could also be reached, with reference to the gripper 61 of the first changer arm 56, if the transfer gripper 112 had been displaced farther to the left in FIG. 11. This is indicated when the tool needs to be conveyed into the gripper 61, which would correspond to the position of the tool changer according to FIG. 4.

Figure 12:
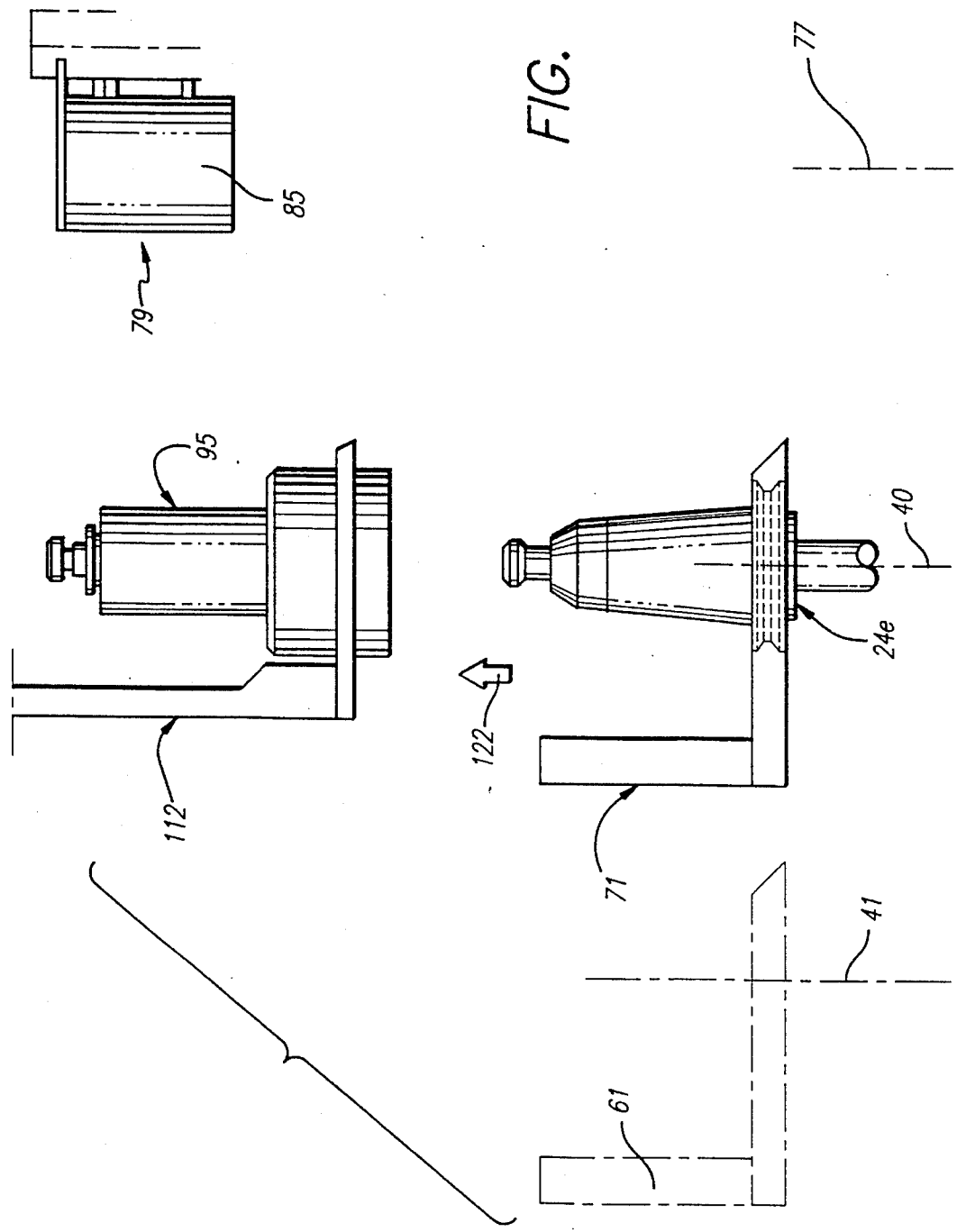
FIG. 12 shows the arrangement according to FIG. 9, but in a fourth operating position.

However, turning back to the arrangement shown with solid lines in FIG. 11, after the transfer gripper 112 with sheath 95 has been elevated in the direction of the arrow 122, the result is a situation that is depicted in FIG. 12. It is evident that the sheath 95 has now been lifted away from the tool 24e, so that the tool 24e can now be conveyed into the spindle 23 by actuation of the tool changer.

Since the tool needed for the previous machining operation is now being brought, as a counter-motion, in the opposite direction out Of the spindle 23 into the second transfer position 41, as the next step (not depicted) the transfer gripper 112 must be displaced out of the position of FIG. 12 to the left and then down, so as to grasp—with the sheath 95 that is now empty —the tool 24 that has been removed from the spindle 23. The transfer gripper 112 is then moved to the right in the depiction of FIG. 12 until it arrived at the loading/unloading position 77, whereupon it is displaced upward. The tool 24 coming from the spindle 23, which is now located in the sheath 95, is then, together with the latter, inserted into its associated sleeve which in the meantime has been brought, by displacement of the chain 78, into the loading/unloading position.

The same steps then occur analogously, in the reverse order, for the next tool change.

It also follows from the above exposition that the movement sequences during tool changing—i.e. both during unloading of a tool from the tool magazine into the spindle and during loading of a tool coming from the spindle into the magazine—occur in principle as the same movement sequences. The differentiation of the two transfer positions 40 and 41 does need to be observed, but can be managed with very simple means. For example, the transfer gripper 112 can be displaced in the horizontal direction (depicted in FIGS. 8 to 12) by means of two pneumatic cylinders arranged in cascade fashion, only one of which is actuated when approaching or moving out of the first transfer position 40, while when approaching or moving out of the second transfer position 41, in each instance relative to the loading/unloading position 77, both cylinders are actuated in succession, so that their displacement travels are added.

It is further understood that the movement sequences mentioned can of course each also be provided in a kinematically reversed fashion.

For example it is possible initially to hold the grippers 61, 71 in a waiting position in which the fingers 72 align with the V-groove 107 in a horizontal plane while the tool is still in the sheath 95 and the latter is still located in the sleeve 85. The transfer gripper 112 then needs in each case to be displaced only in the horizontal direction. On the other hand, to move the tool out of the sheath 95 the respective gripper 71 or 61 must then be displaced downward until the positions according to FIGS. 11 and 12 are reached. As is clearly evident, therefore, the movement sequences can be varied in a great number of ways with no modification to the gist of the manner in which the apparatus operates.

We claim:

1. A machine tool comprising:

a base member;

spindle stock means having a rotatable spindle therein, said spindle having a vertical spindle axis;

means for displacing said spindle relative to said base member;

a tool magazine for storing a plurality of tools, said tool magazine having a load/unload position and a plurality of storage positions and having means for conveying said tools within said tool magazine between said load/unload position and said storage positions, said load/unload position being located above said spindle and laterally offset therefrom in a front view of said machine tool;

tool exchange means having a first and a second exchange arm, said arms operating reciprocally with respect to each other, for transferring a first tool from said load/unload position to said spindle and, simultaneously, tranferring a second tool from said spindle to said load/unload position, said first exchange arm being rotatable about one first exchange arm axis only and exchanging said tools between said spindle and a first transfer position, said second exchange arm being rotatable about one second exchange arm axis only and exchanging said tools between said spindle and a second transfer position, said first and said second transfer positions being located at different distances from said load/unload position; and tool transfer means for transferring said tools between said first and said second transfer positions, respectively, and said load/unload position.

2. The machine tool of claim 1, wherein said transfer positions and said spindle are, in a horizontal plane, arranged at the corners of an isosceles triangle, the apex of which being formed by said spindle.

3. The machine tool of claim 2, wherein the apex angle of said triangle is approximately 48 degrees.

4. The machine tool of claim 2, wherein said exchange arms each comprise a gripper, said grippers being displaced during said tool ·exchanging only within vertical planes containing the equilateral sides of said triangle.

5. The machine tool of claim 1, wherein said first exchange arm axis and said second exchange arm axis enclose between them an angle of approximately 48 degrees.

6. The machine tool of claim 1, wherein said exchange arms are driven by means of pinions meshing with separate toothings arranged on a rack, said rack being displaceable in a vertical direction with said toothings being arranged offset one from another over a periphery of said rack.

7. The machine tool of claim 6, wherein said toothings are offset by approximately 132 degrees.

8. The machine tool of claim 6, wherein said rack is adapted to be displaced by means of a sinusoidal drive.

9. The machine tool of claim 1, wherein said tool transfer means comprises a transfer gripper.

10. The machine tool of claim 9, wherein said transfer gripper is adapted to be displaced in a vertical and in a horizontal direction.

11. The machine tool of claim 9, wherein said tools, during transfer within said transfer means, are held in protective cups.

12. The machine tool of claim 11, wherein said transfer gripper is adapted to engage said cup.

13. The machine tool of claim 1, wherein said means for conveying comprises a chain guided along a continous path, said chain being provided with tool receptacles for conveying said tools received in said receptacles along said continous path such that a predetermined receptacle may be displaced into said load/unload position, said receptacles being arranged along a lengthwise center plane of said chain.

14. The machine tool of claim 13, wherein said tools are held in separate protective cups in said chain such that they are displaced with their axes along said lengthwise center plane of said chain.

15. The machine tool of claim 13, wherein said chain comprises chain links being joined to one another by means of chain pivots, said chain links having a sleeve for receiving said tools.

16. The machine tool of claim 15, wherein said chain runs in a horizontal plane, said sleeves being substantially cylindrical and open downwardly.

17. The machine tool of claim 16, wherein said sleeves are closed off at their top by means of a cover being provided with a first locking device for locking said tools.

18. The machine tool of claim 17, wherein said cover is pivotable in a horizontal plane and has a locking opening for inserting a locking element therethrough, said locking element being associated with said tool, said locking element locking said cover in a vertical direction in a first pivot position, and releasing same in a vertical direction in a second pivot position.

19. The machine tool of claim 18, wherein said cover is adapted to be pivotable about an axis coinciding with the axis of said chain pivot.

20. The machine tool of claim 14, wherein said cups are provided with a second locking device for locking said tools.

21. The machine tool of claim 20, wherein said second locking device comprises a ball catch grasping a standardized toolholder head above a taper of said toolholder, said ball catch being adapted to be actuated by means of a knob being displaceable axially against action of a spring.

22. The machine tool of claim 18, wherein said second locking device comprises a ball catch grasping a standardized toolholder head above a taper of said toolholder, said ball catch being adapted to be actuated by means of a knob being displaceable axially against action of a spring, said actuation knob being, further, coaxially with said locking element, said locking element being configured as a locking collar of said first locking device.

23. The machine tool of claim 16, wherein said chain runs in a horizontal plane, said sleeves being substantially cylindrical and being open downwardly, said tools being held in separate protective cups adapted to be inserted from below into said sleeves.

24. The machine tool of claim 1, wherein said displacing means comprises a travelling column adapted to be displaced relative to said base along at least one horizontal coordinate direction and comprises, further, means for displacing said spindle stock relative to said travelling column along a vertical axis, said tool magazine being configured in an L-shape in a horizontal plane, a first leg of said L being arranged besides said travelling column, and a second leg of said L being arranged behind said travelling column.

25. The machine tool of claim 24, wherein said second leg is longer than said first leg.

26. The machine tool of claim 24, wherein a first energy delivery chain being flexible in one plane only, is guided from a first, stationary articulation point in a horizontal plane to a second, movable articulation point on said travelling column.

27. The machine tool of claim 26, wherein said first energy delivery chain is arranged in a horizontal plane at a top end of said travelling column.

28. The machine tool of claim 26, wherein said first energy delivery chain is so arranged along a loop in a horizontal plane that said loop is always located outside a collision contour of said second leg when said spindle stock is displaced in a vertical direction.

29. The machine tool of claim 24, wherein a second energy delivery chain being flexible in one plane only is arranged in a vertical plane from a third articulation point on said travelling column to a fourth articulation point on said spindle stock.

30. The machine tool of claim 29, wherein said second energy delivery chain is arranged on a side of said travelling column facing away from said first leg of said tool magazine.

31. The machine tool of claim 29, wherein said second energy delivery chain is arranged along a loop in a vertical plane with said loop hanging downwardly.

32. The machine tool of claim 31, wherein said third articulation point lies below said second articulation point.

* * * * *